United States Patent
Nelson et al.

[11] Patent Number: 6,110,281
[45] Date of Patent: Aug. 29, 2000

[54] PRECONDITIONING MEANS FOR NON-WOVEN ROLLS

[75] Inventors: Thomas A. Nelson, Munster, Ind.; James S. Ruscyk, Palos Heights, Ill.

[73] Assignee: Dial-In Equipment Company, Hammond, Ind.

[21] Appl. No.: 08/146,779

[22] Filed: Nov. 1, 1993

Related U.S. Application Data

[63] Continuation-in-part of application No. 07/961,422, Oct. 15, 1992, Pat. No. 5,358,567.

[51] Int. Cl.$^7$ .................................................. B05C 1/02
[52] U.S. Cl. .......................... 118/203; 118/227; 118/249; 118/262; 118/264
[58] Field of Search .................................. 118/203, 227, 118/249, 262, 264; 427/429, 359, 365; 100/160, 121

[56] References Cited

U.S. PATENT DOCUMENTS

| | | | |
|---|---|---|---|
| 2,357,963 | 9/1944 | McIntire | 118/118 |
| 2,369,378 | 2/1945 | Thiele et al. | 118/227 |
| 2,558,773 | 7/1951 | Mulloy et al. | 91/10 |
| 2,598,733 | 6/1952 | Warner | 118/118 |
| 2,672,119 | 3/1954 | Ertner | 118/118 |
| 2,695,004 | 11/1954 | Montgomery et al. | 118/262 |
| 2,729,192 | 1/1956 | Warner | 118/117 |
| 2,900,951 | 8/1959 | Kabelitz | 118/122 |
| 2,977,927 | 4/1961 | Mehler et al. | 118/203 |
| 3,049,441 | 8/1962 | Huang | 117/115 |
| 3,066,046 | 11/1962 | Walton | 118/264 |
| 3,149,005 | 9/1964 | Brundige | 118/70 |
| 3,179,083 | 4/1965 | Warner | 118/104 |
| 3,301,156 | 1/1967 | Roeber | 118/249 |
| 3,312,191 | 4/1967 | Lowe | 118/104 |
| 3,405,006 | 10/1968 | Follrath | 117/213 |
| 3,505,701 | 4/1970 | Keil | 100/121 |
| 3,672,946 | 6/1972 | Herman | 117/102 |
| 3,710,469 | 1/1973 | Kitazawa | 492/40 |
| 3,779,206 | 12/1973 | Sato et al. | 118/63 |
| 4,269,140 | 5/1981 | Burnes et al. | 118/665 |
| 4,297,967 | 11/1981 | Osta | 118/117 |
| 4,425,842 | 1/1984 | Winch et al. | 162/205 |
| 4,475,453 | 10/1984 | Davis | 100/121 |
| 4,559,900 | 12/1985 | Knapke et al. | 118/672 |
| 4,669,163 | 6/1987 | Lux et al. | 492/41 |
| 4,985,733 | 1/1991 | Kurotori et al. | 118/116 |
| 4,999,079 | 3/1991 | Ash | 118/116 |
| 5,122,396 | 6/1992 | Rantanen | 427/359 |

*Primary Examiner*—Laura Edwards
*Attorney, Agent, or Firm*—Wallenstein & Wagner, Ltd.

[57] ABSTRACT

A coating apparatus for controlling processing medium on and in non-woven rollers and on material adapted to pass through rollers is disclosed. The apparatus comprises a pair of non-woven rollers having generally parallel axes and having a porous, generally cylindrical outer surface. The rollers receive and absorb processing medium and have a portion of their adjacent outer surfaces through which material passes in pressure engagement whereby in the regions of the gaps where the rollers engage each other or the material passing therethrough, the processing medium will be of a generally uniform thickness. The rollers have gaps in regions along the edges of the material when the non-woven material passes therethrough. The non-woven rollers will pick-up and carry an excess amount of the medium in the regions to produce a wet edge condition. The apparatus further comprises preconditioning rollers disposed adjacent and generally parallel to at least one of the non-woven rollers and in generally uniform pressure engagement with the rollers to squeeze the non-woven rollers at least across the width of the non-woven roller beyond the edges of the material adapted to be processed therethrough whereby the processing medium will be uniform across the surface of the non-woven roller at least in the area through which the material adapted to be processed passes.

5 Claims, 2 Drawing Sheets

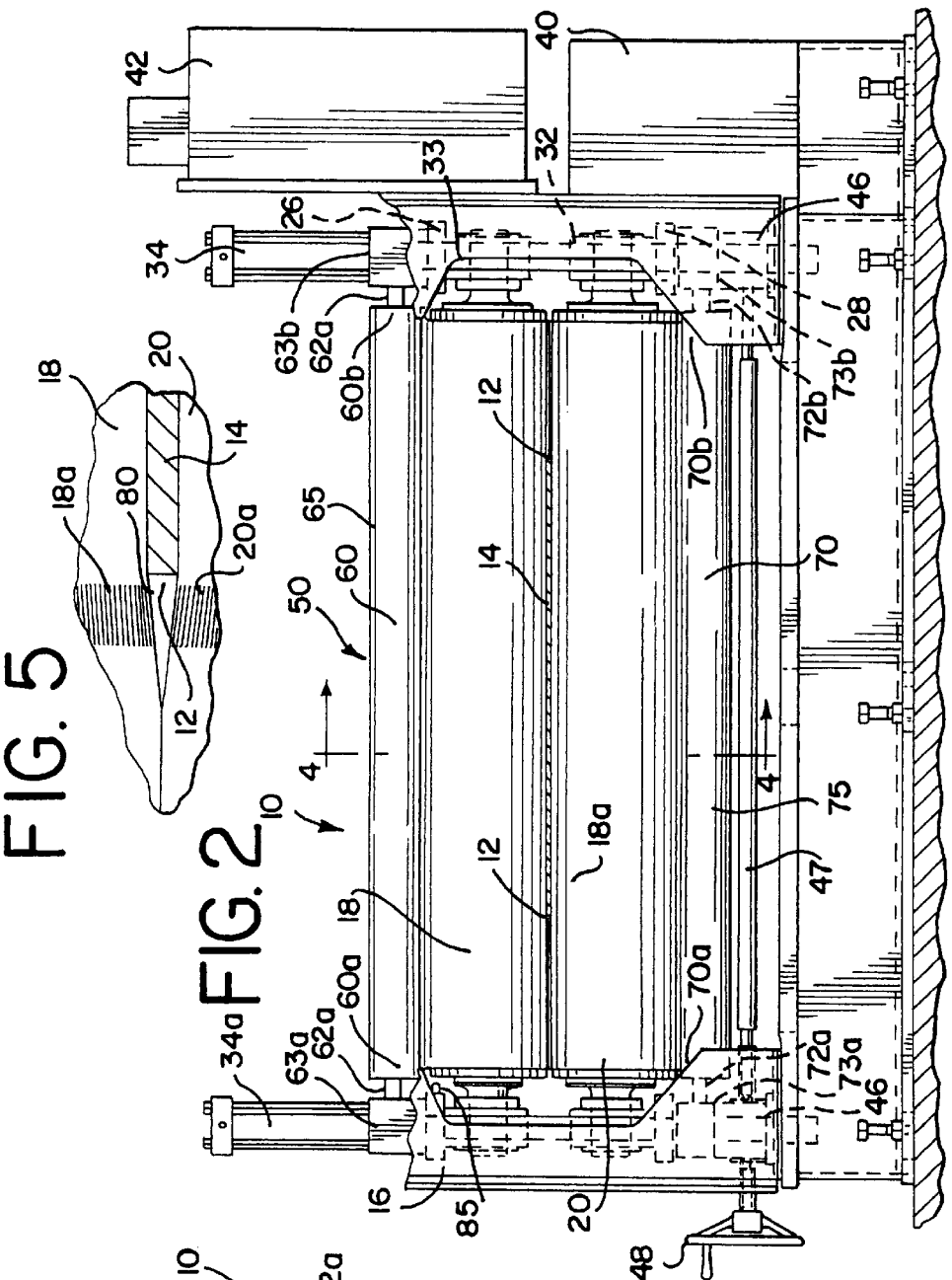

PRECONDITIONING MEANS FOR NON-WOVEN ROLLS

This Application is a continuation-in-part of U.S. application Ser. No. 07/961,422 filed on Oct. 15, 1992, now U.S. Pat. No. 5,358,567.

TECHNICAL FIELD OF THE INVENTION

This invention relates generally to a means for controlling the processing medium present on and in non-woven rollers used in processing sheet or strip material such as steel and more particularly concerns a roll stand combination of one or more non-woven rollers and a preconditioning means cooperating with the rollers to distribute the processing medium across the face of the rollers and to overcome the problem of "wet edge," i.e., buildup of processing medium on the strip edges due to annular rings of processing medium on the rollers resulting from the gaps or void areas on the roller faces adjacent to the material edges. The preconditioning means prevents processing medium buildup and the resultant wet edge condition and may at the same time function to accurately maintain the processing rollers in uniform contacting pressure and alignment with the result that there will be achieved a more uniform amount of processing medium on a non-woven roll and on the sheets of material passing through the roll stand.

BACKGROUND OF THE INVENTION

In an effort to prevent or inhibit corrosion on metal sheet or strip, or to condition it for further processing, it is common practice to deposit a film of corrosion-preventative medium or lubricant on the strip. Processing of sheet and roll material through the use of rotary means such as roll stands is well known and commonly employed. One function of such roll stands is to apply and regulate the amount of a medium such as lubrication oil on material being processed. The material such as steel is typically initially wound in a coil and during further processing the coil is unwound as a strip and passed between the mill rolls. Depending upon the amount and consistency of the lubricant medium on the material, as well as the amount desired, the roll stand functions to regulate the amount by adding medium to the strip material, removing medium from the strip or both.

In order to maintain the desired amount of medium on the strip, a very precise pressure must be maintained between the rolls. In order that the layer of lubricant medium be uniform, the pressure between the rolls must be consistent across the length of the rolls. Further, in order that the strip or sheet properly tracks as it passes between the rolls, the rolls must be properly maintained in parallel alignment.

The deposit of the medium such as lubricants has been accomplished by various methods such as spray, electrostatic application, and direct application using both stationary and rotary means. Direct rotary application is presently being used in conjunction with spray application by first spraying the medium lubricant either directly on the strip or on the applicator rolls, then passing the strip between two opposed applicator rolls which distribute the compound evenly across the width of the strip.

Efforts to achieve uniform coating of the medium on the strip and avoid buildup of the medium have included the use of different materials and different surface configurations or textures. Different materials tried have progressed from rubber, to nylon, to urethane and more recently to composite "non-woven" rolls comprising non-woven synthetic fiber discs that are stacked and/or bonded together with a tough, yet flexible binder resin.

The use of non-woven rolls in place of rubber, urethane or felt rolls in ringer, oiler, tension/bridle or support roll applications has been known for at least 10 years. Unlike dense, closed surface rollers such as those made of rubber or nylon, the non-woven rolls such as made by the use of 3M material for example in various sizes and materials offer a high percentage void volume that provides a degree of absorption which aids in squeegeeing and tension functions during the rolling process.

One of the problems associated with the use of the direct rotary method particularly on non-woven rolls has been "wet edges." This phenomenon takes the form of narrow bands of processing medium located along the longitudinal edges of the strip or sheet. They are attributable to the fact that when running heavy gauge strip material, the non-woven rolls do not close completely at the strip edges, and a small amount of processing medium pools in these gaps and is carried through them. The porous roll faces, which are normally pressed either against the strip or against one another to effectively wring medium out of the rolls, run with a small amount of "free surface" at these gaps, and are not "wrung out" as they would be elsewhere along the roll face. The medium builds up in these areas and forms annular bands on the porous roll faces. At the exit side of the roll bite, some of this medium ends up being redeposited on the strip. The edge buildup can also create problems of splattering, misting, etc.

The present invention is provided to solve these and other problems.

SUMMARY OF THE INVENTION

It is an object of the present invention to provide an improved roll stand construction including one or more preconditioning means pressing against an adjacent applicator roll to distribute the medium evenly across the face of the applicator roll and to regulate the amount of lubricant medium carried by the roll across its width.

It is a further object of the invention to provide a preconditioning means in pressure contact with a non-woven applicator roll to prevent a build up of processing medium causing "wet edge," i.e., the circumferential annular rings of medium on the applicator rollers resulting from the gaps or void areas between the rollers adjacent the edges of material passing through the rollers.

In accordance with the invention, a preconditioning means bears against at least one of a first or second roller in a roll stand. The rollers extend between and are held at opposite ends by first and second spaced support members having suitable mounting means such as hydraulic pistons and cylinders adaptable to move each of the carriers relative to one another to control the pressure between the rolls.

In this combination of rollers, we have discovered that the addition of a preconditioning means such as one or more rotating rollers or stationary bars bearing against one or more of the applicator rollers results in avoiding a "wet edge" problem and providing a uniform covering of lubricant medium across the entire width of the material strip. In some cases, the use of only one preconditioning means has been effective. Other applications, involving heavier gauge materials, have required two such devices which may be arranged in a wide variety of positions but usually above the top roller and below the bottom roller.

The preconditioning roll or bar pressed against the applicator roll provides a number of advantages. First, it distributes the medium evenly across the face of the applicator roll. Second, it "pre-wrings" or "pre-conditions" the circumferential annular rings of medium resulting from the gaps or void areas on the roll face to prevent medium buildup and the resultant "wet edge" condition. Third, it functions as a pressure distributing member to further insure uniform pressure of the processing rollers across their length. Fourth, when the preconditioning means includes one or more helical grooves that extend past the edges of the applicator rolls, the preconditioning means serves to provide for more effective displacement of built up medium toward the end of the applicator roll. In such case, the additional length of the preconditioning means also provides a convenient means of removing excess medium entirely. By this means, the excess can be conveniently recycled.

Other features and advantages of the invention will be apparent from the following specifications taken in conjunction with the following drawings.

BRIEF DESCRIPTION OF THE DRAWINGS

FIG. 2 is an elevational view of the structure of FIG. 1 with the enclosure and medium applicator means removed to show the relationship of the applicator rollers and preconditioning means;

FIG. 3 is an elevational end view of the roll stand of FIGS. 1 and 2 with parts shown in section;

DETAILED DESCRIPTION OF THE INVENTION

Figure 4:
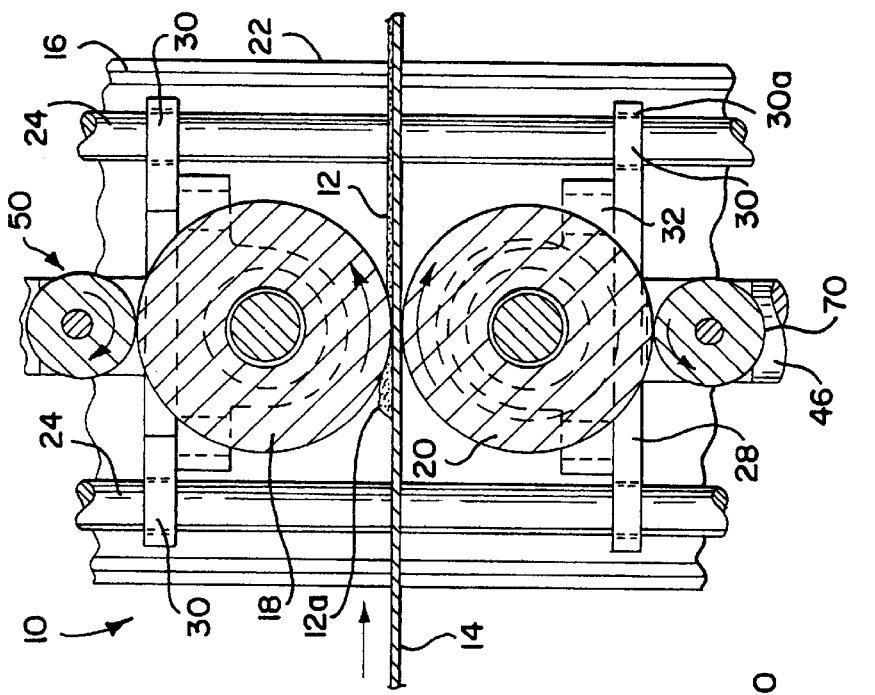
FIG. 4 is an enlarged, more schematic view of the invention as would be seen from lines 4—4 in FIG. 2; and, FIG. 5 is a greatly enlarged section of a circled portion of FIG. 2.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

What may be characterized as an oiler stand, generally indicated at 10 in the Figures, functions to apply and regulate the amount of medium 12, such as a lubricant, present on a continuous strip or sheet of material 14, such as steel, tin or the like, during processing. The medium 12 is used to prevent or inhibit corrosion on the metal or to condition it before further processing. As used herein, the term "oiler" means a device which adds medium 12 such as lubricant to the strip, removes lubricant from the strip, or does both. The important consideration is that the strip have a uniform layer of lubrication after it exits the "oiler" for further processing, coiling, transport, storage and reuse.

The medium or lubricant 12 is typically petroleum based, water based, or a dry lubricant, as is well known. The strip 14 can be initially lubricated, unlubricated, or unevenly lubricated. As discussed below, the de-oiler 10 can be adjusted to remove a quantity of the lubricant 12 already on the strip 14, to thereby provide a uniform, but thinner, layer of the lubricant 12. Further, the de-oiler 10 can be adjusted to spread the lubricant 12 to thereby provide a consistent thickness of the lubricant 12 along the strip.

The de-oiler 10 comprises a roll stand 16 adapted for supporting upper and lower rolls 18, 20, respectively. The rolls 18, 20, are designated herein as 'upper' and 'lower,' though it should be understood that other relative positions of the rolls 18, 20 are comprehended as within the spirit and scope of the invention.

The rolls 18, 20 are made from a plurality of individual, non-woven, resin-bonded, fiber discs, such as 3M Mill Rolls, sold by the 3M Abrasive Systems Division, 3M Corporation, St. Paul, Minn. The material is densely packed, with a ratio of up to 97% material and 3% void. Other materials may be used. One size of non-woven rollers measures 11" O.D., and 8" I.D., with a 72" face length. Of course, it will be understood that the rolls range in size from at least 3–36 inches in outside diameter and are of lengths to cover all known sheet processing requirements. The non-woven discs used to make the rolls are placed on a shaft that for example may be machined from SAE 1045 hot rolled solid bar to a diameter of 8". Keys or keyways may be spaced around the roll face. The rolls such as 18 and 20 and of other sizes are available through Dial-In, Inc., Lansing, Ill.

The roll stand 16 includes a pair of opposed, spaced, support members 22 for supporting the upper and lower rolls 18, 20, extending therebetween.

As shown in greater detail in FIGS. 3 and 4, the support members 22 each include a pair of guide rods 24. The support members 22 include upper and lower support weldments 22a, into which the guide rods 24 are pressed for rigidity. Each of the support members 22 further includes upper and lower, spaced carriers 26, 28 respectively, which are slidably carried by their respective guide rods 24. Specifically, each of the carriers 26, 28 has a pair of spaced holes 30. The holes 30 are each 2.500" in diameter, into which a bronze bushing 30a is press fit. In the preferred embodiment, the holes 30 of each of the carriers 26, 28, are spaced on 16.125" centers, ±0.001". This tolerance is critical to insure proper alignment of the guide rods 24 and the carriers 26, 28, to maintain proper alignment of the rolls 18, 20.

Each of the support members 22 includes two pillow block bearings 32, each bolted to a respective one of each of the carriers 26, 28. The bearings 32 conventionally receive respective ends of the rolls 18, 20.

Each of the support members 22 further includes a hydraulic piston and cylinder device 34 to move each of the upper carriers 26 relative to their respective lower carriers 28, along the guide rods 24 to control the contact pressure between the upper and lower rolls 18, 20. The hydraulic piston and cylinder devices 34 provide a force of up to 350 lbs. per linear inch of roll face. The hydraulic pressure is provided to each of the piston and cylinder devices 34 by common hydraulic lines 38 to maintain equal pressure, and hence equal force, applied by each of the piston and cylinder devices 34. The hydraulic pressure is provided and regulated by conventional hydraulic controls (not shown). An electrical control cabinet 42 houses conventional electrical controls (not shown).

Each of the support members 22 further includes a conventional mechanical jack 46, tied together for concurrent rotation by a connecting bar 47, for adjusting the height of the respective lower carrier 28. The jack 46 can be a machine screw actuator, such as sold by Duff-Norton, of Charlotte, N.C. The jack 46 can be manually actuated, as by a handwheel 48, or motorized. The jacks 46 cooperatively move each of the lower carriers 28 to adjust the lower roll 20 to the proper height, such as to compensate for regrinding of the rolls 18, 20, which changes their diameter.

Figure 1:
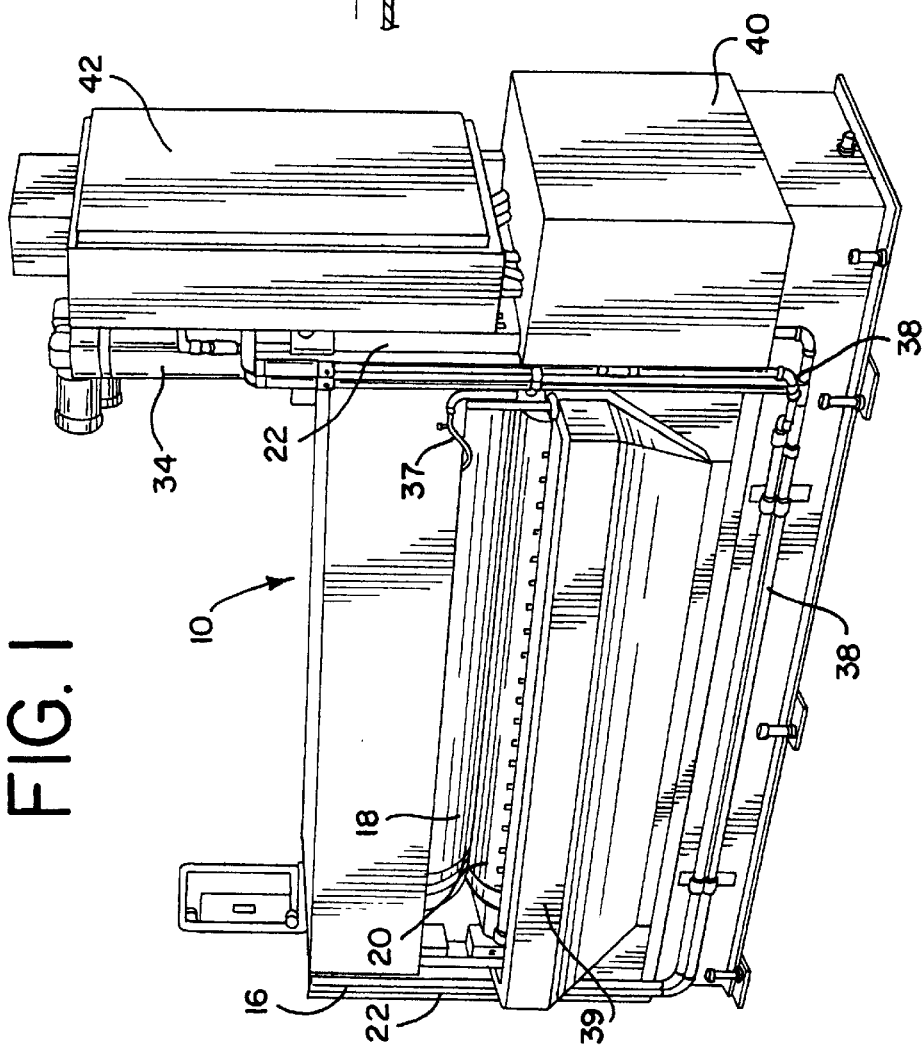
FIG. 1 is a perspective view of a roll stand in accordance with the present invention.

In operation, as shown in FIG. 4, the strip 14, which typically is being concurrently unwound from a coil of steel (not shown), traverses between the upper and lower rolls 18, 20. The pressure between the rolls 18, 20 as determined by the piston and cylinder device 34, determines the thickness of the lubricant 12 as the strip exits from between the upper and lower rolls 18, 20. Film thickness can be controlled between 2 and 700 mg., per square foot. Extra lubricant 12 forms as a pool 12a behind the rolls 18, 20. As illustrated in FIG. 1, if additional lubricant is required, it is provided by a nozzle 49, which collects the lubricant 12 from a reservoir or a sump 39 via a motor controlled lubrication delivery system.

In accordance with an embodiment of the present invention, we provide one or more preconditioning means generally indicated at 50 such as the rollers shown at 60 and 70 axially aligned and in pressure contact with rollers 18 and 20 respectively. Opposite ends 60a, 60b and 70a, 70b respectively of the preconditioning roller means 60, 70 may extend beyond the ends of rolls 18, 20 and have outwardly extending axle means 62a, 62b, 72a and 72b respectively suitably mounted in adjustable bearing block means 64a, 64b and 74a, 74b respectively whereby the rollers 60, 70 may freely rotate and be adjusted to exert a specific predetermined force on the rolls 18, 20 respectively. The means for applying pressure to the rolls may be by the same or similar piston and cylinder devices 34 used for a similar function with respect to rolls 18 and 20. Typically a pressure of five to one hundred pounds per lineal inch has been found adequate with the embodiment of the non-woven rolls contemplated herein.

It was recognized by applicants that the non-woven rolls 18, 20 absorb liquids similar to a sponge and unless it is effectively wrung out as for example by being subjected to pressure, the rolls become saturated. Thus, in regions 18a and 20a of the rollers 18 and 20 respectively where the material 14 keeps the regions out of contact with each other and thereby creates a gap or void 80 that fills with medium, the rolls become saturated and build up fluid to produce annular circumferential bands of medium that is redeposited on the strips as it leaves the roll to cause "wet edges." It may also produce a mist or splatter and generally cause an uneven medium thickness and other problems.

We have discovered that by adding the preconditioning means 60 in accordance with the invention in sufficient pressure engagement with the non-woven applicator roll either at a point around the circumference of roll 18 such a shown in the drawing at 60 and/or at a point around the circumference of roll 20 such as shown at 70, the processing medium 12 either on or in porous non-woven rolls 18, 20 is squeezed or wrung out at their points of contact and especially in the region 18a, 20a whereby the problems in the prior art are avoided and the advantage of the instant invention realized.

The preconditioning means 50 may be a device comprised of one or more small-diameter rolls such as shown at 60 or 70 or similarly situated bars not shown or a combination of both. Whatever the case, they are generally aligned with and in pressure engagement with the respective adjacent applicator roll 18 or 20 to squeeze the medium off of and out of the roll. The preconditioning means 50 provides several important advantages. First, it distributes the medium 12 evenly across the face of the respective adjacent applicator roll in a manner similar to "calendaring."

Second, the squeezing action of the means 50 "pre-wrings" or "pre-conditions" the non-woven rolls particularly in the areas of the annular rings 18a or 20a resulting from the gaps or void areas 80 on the roll face to prevent build up of medium and/or the resultant "wet edge" condition. This is a significant advantage because although "wet edge" has been a problem with non-woven rolls since their introduction more than ten years ago, it is a continuing problem that has not, to the best of applicant's knowledge, been effectively addressed by any other approach.

Third, the preconditioning means 50 such as rolls 60, 70 provide the synergistic benefit of creating a higher and more uniform pressure distribution on the rolls 18, 20 so that the portions in contact with the material 14 produce a more uniform coating. This can also help to reduce the size of the gap 80. In practice we have found that the optimum pressure to be applied to the roll face to produce improved results depends on the fluid applied, the density of the roll, the percentage of voids or porosity, and the maximum roll speed. This could range from 5 to 100 pounds per lineal inch. In some cases, the use of only one preconditioning roll has been effective. Other applications, involving heavier-gauge strip where the gap 80 would be larger have required two such devices such as both 60 and 70.

The preconditioning rollers 60, 70 may, in some cases, include one or more helical grooves 65, 75 in the surface of rolls 60 and 70 respectively and may extend past the edges of the applicator roll. The helix may be arranged so that as the rolls 60, 70 rotate in normal operation, the squeezing action forces the medium 12 in a direction outwardly from the center to the roll edges. The grooves 65, 75 provide for more effective displacement of built up medium outwardly toward the ends 60a, 60b and 70a, 70b respectively of the applicator roll. In practice we have found it advantageous for the preconditioning means 50 to extend beyond the edges of the rollers 18, 20. Thus, the additional length of the preconditioning roll provides a convenient means of completely removing excess medium from the rolls 18, 20 and collecting it. Thus, excess medium 12 flows out through groove 65, 75 to the edge where it is caught in a collecting means 85 that can then be merely drained back into the medium supply reservoir 39.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. For instance, it is contemplated that the present roll stand could be used for such purposes as wringing water from textiles.

What is claimed is:

1. A coating apparatus for controlling processing medium on and in non-woven rollers and on material passing through said rollers, the apparatus comprising a pair of non-woven rollers having generally parallel axes and each having a porous, generally cylindrical outer surface, said rollers to receive and absorb said processing medium, said rollers having a portion of their adjacent outer surfaces through which said material passes in pressure engagement whereby in regions where the rollers engage each other or the material passing therethrough, the processing medium will be of a generally uniform thickness; said rollers to have medium collecting gaps in regions along edges of the material when said material passes therethrough whereby said non-woven rollers will pick-up and carry an excess amount of said medium in said regions to produce a wet edge condition; and a preconditioning roller disposed adjacent and generally parallel to one of said non-woven rollers and in generally uniform pressure engagement with said roller to squeeze said non-woven roller at least across the width of said roller beyond the edges of the material to be processed therethrough, to thereby wring said medium from said gaps. whereby the processing medium will be uniform across the surface of said roller at least in the area through which the material adapted to be processed passes.

2. The apparatus of claim 1 wherein said preconditioning roller and said non-woven roller each have a diameter and said preconditioning roller is of a diameter smaller than said non-woven roller diameter.

3. The apparatus of claim 1 wherein said preconditioning roller is non-porous.

4. The apparatus of claim 1 wherein said preconditioning roller is of a length greater than the length of at least one of said non-woven rollers.

5. The apparatus of claim 1 wherein a second preconditioning roller is disposed adjacent and generally parallel to the other of said pair of non-woven rollers and is in pressure contact with said other non-woven roller.

* * * * *